Sept. 15, 1970     A. F. OLDROYD     3,528,705
AUTOMOBILE HUB CAP

Filed March 14, 1968     2 Sheets-Sheet 1

INVENTOR:
ARTELL F. OLDROYD
BY:

ATTORNEY

Sept. 15, 1970     A. F. OLDROYD     3,528,705
AUTOMOBILE HUB CAP

Filed March 14, 1968     2 Sheets-Sheet 2

INVENTOR:
ARTELL F. OLDROYD
BY:
ATTORNEY

United States Patent Office 3,528,705
Patented Sept. 15, 1970

3,528,705
AUTOMOBILE HUB CAP
Artell F. Oldroyd, 724 E. 2nd St., Apt. 2,
Salt Lake City, Utah 48103
Filed Mar. 14, 1968, Ser. No. 713,182
Int. Cl. B60b 7/04; B60r 13/00
U.S. Cl. 301—37                        6 Claims

ABSTRACT OF THE DISCLOSURE

A hub cap, for use on the wheels of automobiles, that is made up of an attachment member, a replaceable, decorative member, and a transparent retaining member.

BRIEF DESCRIPTION

Hub caps, used to cover the bolts and nuts securing the wheels to the hubs of an automobile have long been made in one piece and usually of chrome plated metal. Each model of automobile has its own distinctive design formed on the outside of the hub cap and if one hub cap of a set is damaged or lost, it is often very difficult to obtain a replacement. Furthermore, even if such a replacement is available, it is frequently very costly.

Many individuals also like to customize their automobiles to make them individually distinctive. As a part of such customizing, special sets of hub caps are usually purchased at very high prices.

There is, therefore, a need for a hub cap that can be economically produced and sold, that can be readily adapted to provide a distinctive appearance by the auto manufacturer, but that can be readily and inexpensively, changed to provide a customized appearance by the owner of the vehicle.

It is an object of the present invention to provide a low cost hub cap made of inexpensive materials, and constructed such that it can be readily arranged to provide virtually any desired appearance and such that it is a simple, low cost operation to subsequently change the hub cap design as desired.

Principal features of my invention include an attachment member adapted to be connected to the wheel of an automobile in conventional hub cap fashion; a low cost, decorative member, adapted to fit against the attachment member and to provide a decorative facing therefor; and a retaining member arranged to fit over the decorative member so that the decorative member is protected against dirt, etc. and damage from weather and impact.

Additional objects and features of the invention will become apparent from the following detailed description and drawings, disclosing what is presently contemplated as being the best modes of the invention.

THE DRAWINGS

Figure 1:
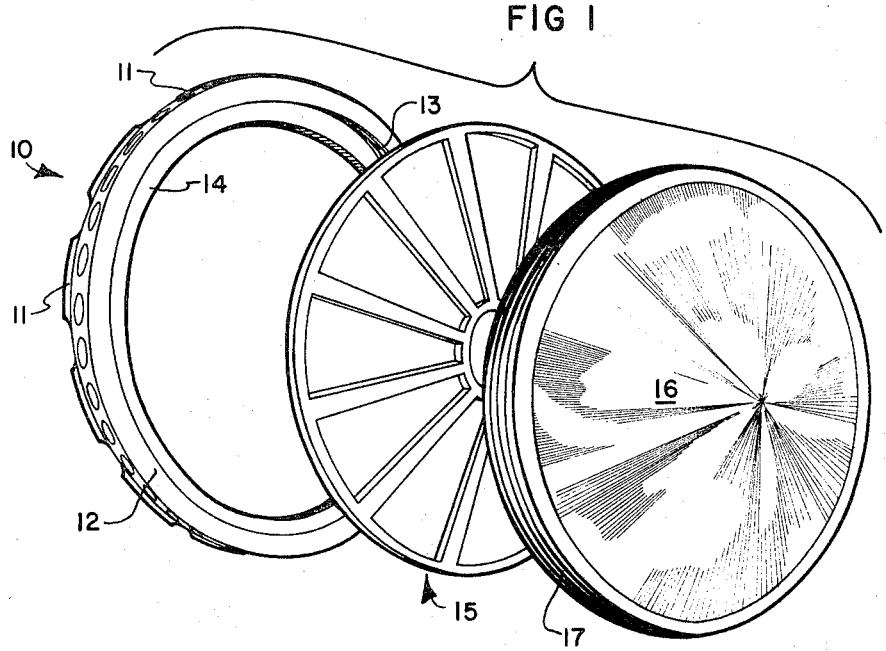
Figure 3:
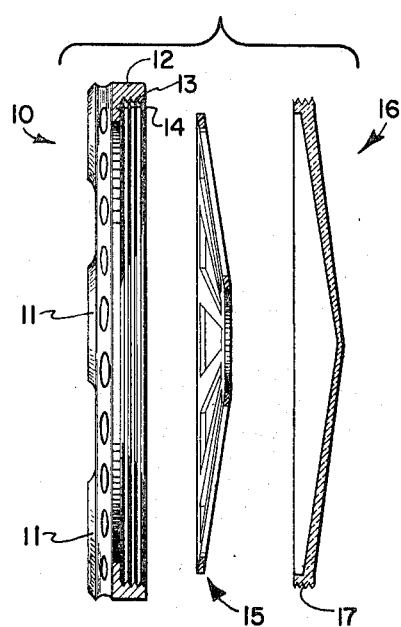
Figure 2:
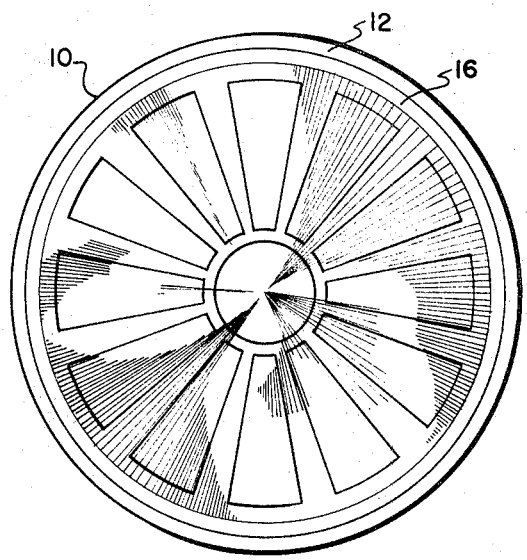
Figure 6:
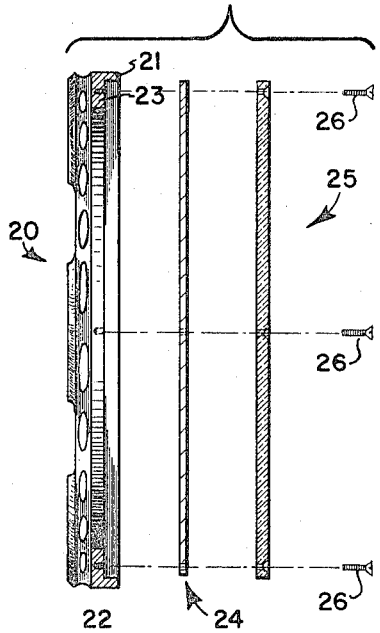
Figure 4:
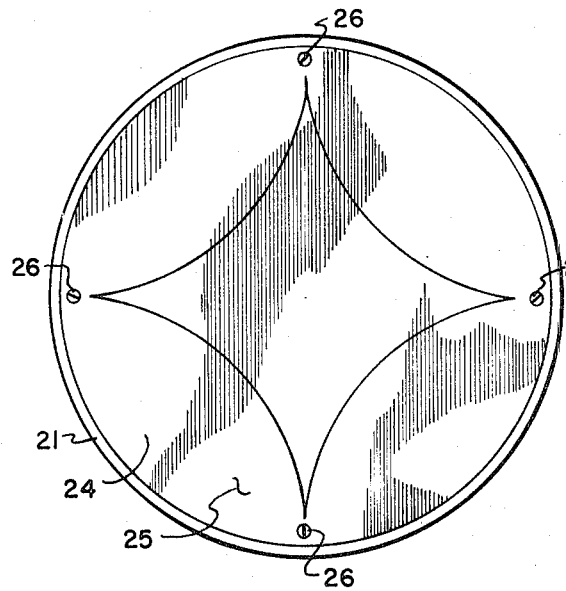
Figure 5:
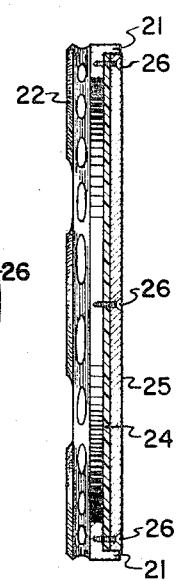
Figure 7:
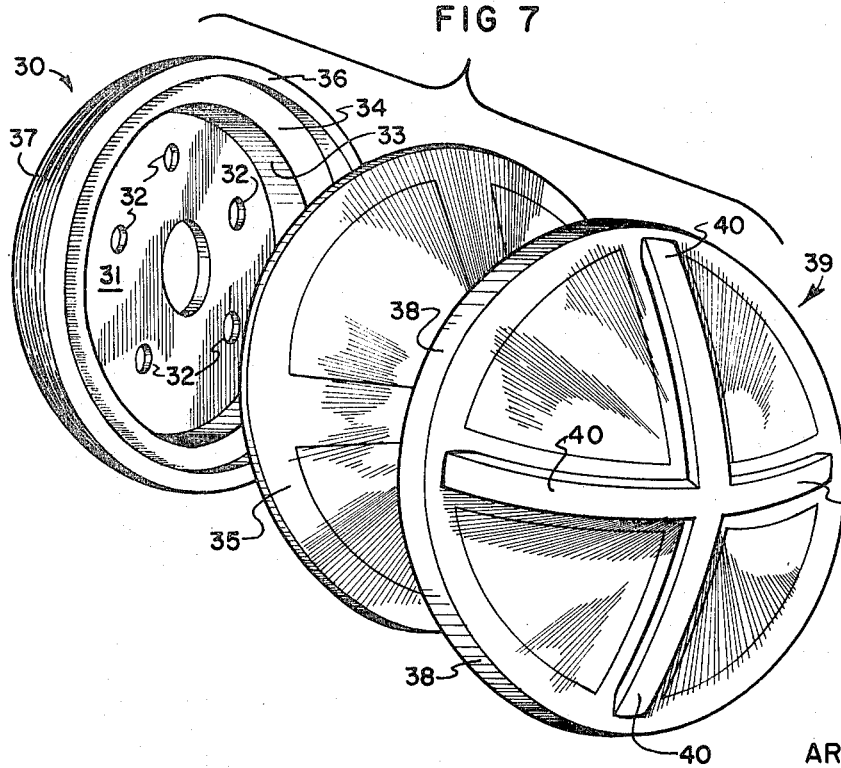
Figure 8:
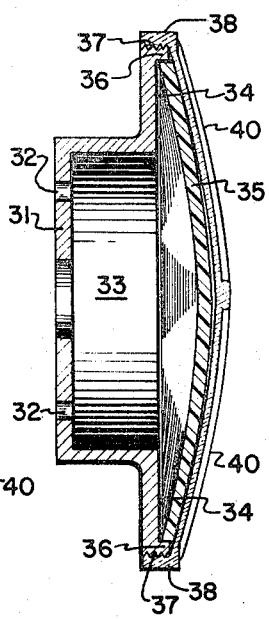

FIG. 1 is an exploded perspective view of one embodiment of the invention;

FIG. 2, a front elevation view of the same embodiment of the invention;

FIG. 3, an exploded, vertical section, taken on the line 3—3 of FIG. 2;

FIG. 4, a front elevation view of another embodiment of the invention;

FIG. 5, a vertical section, taken on the line 5—5 of FIG. 4;

FIG. 6, a view like FIG. 5 but with the parts exploded, for clarity;

FIG. 7, an exploded perspective view of still another embodiment of the invention; and FIG. 8, a view like FIG. 5, but showing the embodiment of FIG. 7.

DETAILED DESCRIPTION

Referring now to the drawings:

In the illustrated embodiment of FIGS. 1–3, an attachment member 10, constructed to have spring clips 11 of the type conventionally found on hub caps, formed on the back side thereof, is adapted to be connected in conventional hub cap fashion to the rim of a wheel of an automobile.

The attachment member is preferably made of metal and, as illustrated, has an outer rim 12 that may be exposed and may, if desired, therefore be chrome plated to provide an attractive appearance. The portion of member 10 within rim 12 may be solid in which case it must provide clearance for the lug bolts and lug nuts or it may be open, as shown. The inner edge of rim 12 is provided with threads 13 and a shoulder 14 projects inwardly therefrom.

A decorative member 15 is adapted to fit inside rim 12, against shoulder 14, and a retaining member 16 has a threaded edge 17, adapted to be threaded into rim 12.

Decorative member 15 may have any desired design on the face thereof and the design can be either flat or three dimensional, as shown. The decorative member will preferably be made of plastic or other such inexpensive material and can be of any desired color or color combination. In many cases the decorative member is made of metallic plastic which has the shiny appearance of chrome plated metal.

Retaining member 16 is threaded into rim 12 to hold decorative member 15 tightly against shoulder 14. The retaining member is transparent and preferably made of a strong, impact absorbing plastic. It can take any desired shape, but will generally conform to the outermost surface of the decorative member, as shown. However, the retaining member does not necessarily have to fit close against the entire surface of the decorative member, and, in fact, in some cases it may be desirable for the decorative member to be free for movement with respect to the attachment member 10 and the retaining member 16, or it may be that a desired esthetic appearance can be obtained by providing space between the decorative member and the protective retaining member.

In any event, the attachment member can be stamped out of low cost metal and, at most, only the rim need be chrome-plated. The decorative member can be formed from very inexpensive plastics or other such suitable material and, as a result, can be discarded and replaced at very low cost. The retaining member, although made of a more costly plastic material capable of withstanding impact, can also be readily mass produced at a low individual cost.

In FIGS. 4–6, there is shown another embodiment of the invention. In this embodiment, the attachment member 20 is like that heretofore described, in that it is of ring-like configuration, with a rim 21, and conventional spring clips 22 for securing it to the wheel of a vehicle. A shoulder 23 is provided on which a decorative member 24 is positioned, and a retaining member 25 fits over the decorative member and is secured to the shoulder 23 by screws 26.

As here illustrated, both the decorative member 25 and the retaining member 25 are made flat and the screws 26 are passed through holes therein. However, as has been previously noted, other configurations could be employed. It should also be apparent that still other types of securement devices could be used to clamp the retaining member to the attachment member, with the decorative member therebetween.

In FIGS. 7 and 8 there is shown still another embodiment of the invention. In this embodiment, the attachment member 30 does not include the conventional spring clips for attaching it to a vehicle wheel. Instead, the attachment member includes a rear wall 31 adapted to fit tight against the wheel and holes 32 therethrough arranged such that they will align with the lug bolts. When the wheel is placed on the vehicle hub the attachment member 30 is positioned against the wheel, with the lug bolts protruding through holes 32. The lug nuts are then turned down tight to hold both the wheel and the attachment member in place.

The attachment member has a peripheral wall 33 that extends outwardly from the wheel to a shoulder 34 on which a decorative member 35 can be positioned and a rim 36 that is exteriorly threaded to match the threads 37 formed on the inside of a rim 38 of the retaining member 39. If desired, one or more ribs 40 can be provided on the outer face of retaining member 39 to serve as handles as the retaining member is screwed onto or off of the rim 36.

With this embodiment of the invention, as with those previously disclosed, the decorative member can be easily and economically replaced by an individual desirous of changing or customizing the appearance of the vehicle. Also, with this embodiment, if desired, the decorative member can be provided with holes so that it can also be fitted over the lug bolts to be clamped in place by the lug nuts. The decorative plate can then provide an attractive background that will enhance the wheel appearance, even if it is desired that the lug nuts be exposed to view through the retaining member 39.

If no decorative member is desired, the hub, lug bolts and lug nuts can be viewed through the transparent retaining member.

As was previously noted, the decorative member can be of any color or of any desired color combination. In addition, the retaining member can be clear, or tinted, so long as the decorative member can be viewed therethrough, to give any desired esthetic appearance.

Although preferred forms of my invention have been herein disclosed, it is to be understood that the present disclosure is by way of example and that variations are possible without departing from the hereinafter claimed subject matter I regard as my invention.

I claim:
1. A hub cap for vehicle wheels, comprising
an attachment ring member including means removably securing it to a vehicle wheel;
a replaceable decorative disc member adapted to rest against an axially outwardly facing annular shoulder on the attachment ring member;
a transparent retainer disc member; and
threaded means substantially on the periphery of the transparent retainer member and cooperating threads on the attachment member for securing said attachment and retainer members together, with the decorative member therebetween.

2. A hub cap for vehicle wheels, according to claim 1, wherein the decorative member is flat.

3. A hub cap for vehicle wheels, according to claim 1, wherein the decorative member has a three-dimensional decorative surface.

4. A hub cap as in claim 1, wherein the threaded means comprises threads on the outer periphery of the retainer member and mating threads inwardly of the outer periphery of the attachment member.

5. A hub cap as in claim 1, wherein the threaded means comprises cooperating circumferential threads on the said attachment and retainer members.

6. A hub cap as in claim 5, further including
ribs on the retainer member providing gripping means for turning said retainer member with respect to said attachment member.

References Cited
UNITED STATES PATENTS

| | | | |
|---|---|---|---|
| 2,593,274 | 4/1952 | Dandurand | 301—108 |
| 1,116,498 | 11/1914 | Schubert. | |
| 1,147,746 | 7/1915 | Nesine | 301—108 |
| 1,814,054 | 7/1931 | Munson | 301—37 |
| 2,206,437 | 7/1940 | Tracy. | |
| 3,178,231 | 4/1965 | Hezler | 301—37 |
| 3,337,271 | 8/1967 | Lyon | 301—37 |
| 3,397,917 | 8/1968 | Aske | 301—37 |

RICHARD J. JOHNSON, Primary Examiner